United States Patent [19]

Tarplee

[11] Patent Number: 4,516,400
[45] Date of Patent: May 14, 1985

[54] MASTER CYLINDER ASSEMBLY FOR A VEHICLE BRAKING SYSTEM

[75] Inventor: Michael K. Tarplee, Birmingham, England

[73] Assignee: Lucas Industries public limited company, Birmingham, England

[21] Appl. No.: 374,693

[22] Filed: May 4, 1982

[30] Foreign Application Priority Data

May 15, 1981 [GB] United Kingdom ............... 8115016

[51] Int. Cl.$^3$ .................................................. F15B 7/00
[52] U.S. Cl. ....................................... 60/535; 60/545; 60/562; 60/581; 60/589
[58] Field of Search ................. 60/581, 562, 545, 589, 60/591, 535, 548

[56] References Cited

U.S. PATENT DOCUMENTS

| | | | |
|---|---|---|---|
| 3,216,194 | 11/1965 | Yardley | 60/562 |
| 3,393,514 | 7/1968 | Cripe | 60/562 |
| 3,412,557 | 11/1968 | Williams | 60/562 |
| 3,889,469 | 6/1975 | Cryder et al. | 60/562 |
| 4,006,593 | 2/1977 | Edwards | 60/581 |
| 4,132,073 | 1/1979 | Ewald | 60/562 |
| 4,295,336 | 10/1981 | Falk | 60/562 |

FOREIGN PATENT DOCUMENTS

| | | | |
|---|---|---|---|
| 0057640 | 8/1982 | European Pat. Off. | 60/581 |
| 2098687A | 11/1982 | United Kingdom | 60/562 |

*Primary Examiner*—Sheldon J. Richter
*Assistant Examiner*—Randolph A. Smith
*Attorney, Agent, or Firm*—Scrivener Clarke Scrivener and Johnson

[57] ABSTRACT

In a dual master cylinder assembly comprising two independently and simultaneously operable master cylinders, primary pressure spaces between primary and secondary pistons are interconnected by a pipe-line, and secondary spaces between the secondary piston and adjacent ends of the master cylinders are connected to a common auxiliary braking system through a pipe-line. Each secondary piston is provided with an arrangement of passages in communication at all times with a reservoir for fluid, and normally open primary and secondary recuperation valves provide communication between the passages and the respective pressure spaces when the pistons are in their retracted positions. Simultaneous operation of both master cylinders causes both pairs of primary and secondary recuperation valves to close followed by pressurization of the fluid in both pairs of primary and secondary pressure spaces, whereby to apply simultaneously the brakes on opposite sides of the vehicle and to operate the auxiliary braking system. Operation of one of the master cylinders on its own causes the primary and secondary recuperation valves of that master cylinder to close followed by pressurization of the fluid in the primary pressure space but with fluid in the secondary pressure space being displaced to the reservoir through the open secondary recuperation valve of the other, inoperative, master cylinder whereby to prevent operation of the auxiliary braking system.

6 Claims, 5 Drawing Figures

MASTER CYLINDER ASSEMBLY FOR A VEHICLE BRAKING SYSTEM

This invention relates to master cylinder assemblies for vehicle hydraulic braking systems of the kind in which separate master cylinders are connected by a transfer passage through which the pressure spaces in the cylinders are in communciation when the master cylinders are operated simultaneously for vehicle retardation, and communication between the pressure spaces is cut off by transfer valve means when one of the master cylinders is operated on its own to facilitate steering.

Where used herein the term "master cylinder" is intended to cover constructions in which a pedal operates a piston to pressurise hydraulic fluid in a pressure space or to constructions in which a pedal is operative to operate a valve for controlling the supply of pressureised fluid to a pressure space, either from a source of high pressure fluid, or by throttling a supply of pressure fluid which is normally recirculated through the pressure space in a closed circuit at low pressure.

It is often desirable to modify master cylinder assemblies of the kind set forth in order to provide means for operating auxiliary brakes, suitably brakes on a trailer, separate from and additional to those adapted to be applied directly from the pressure spaces, for example brakes on wheels on opposite sides of the vehicle. Such a modification involves the provision of secondary or floating pistons in advance of primary pedal-operated pistons with primary pressure spaces, which are interconnected through the transfer passage being defined between the two pistons, and secondary pressure spaces being defined between the secondary pistons and the closed ends of the bores. Pressurised fluid in the secondary pressure spaces is utilised in operating the auxiliary brakes when both master cylinders are operated simultaneously but often it is preferably for this to be achieved indirectly in constructions in which the volume of fluid normally displaced from the secondary pressure spaces when the master cylinders are operated is insufficient to operate the auxiliary brakes directly. Such constructions are compact axially and limiting the volumes of the secondary pressure spaces reduces the effective pedal travel necessary to operate the brakes upon failure of the secondary pressure spaces. The difficulty of operating the auxiliary brakes directly is normally overcome by utilising the fluid from the secondary pressure spaces as a source of operating fluid to actuate an hydraulic power-operated control valve or booster of an auxiliary braking system for operating the auxiliary brakes. An additional isolator valve is also incorporated in the assembly to prevent the auxiliary brake from being applied when one master cylinder is operated on its own to facilitate steering.

According to our invention in a master cylinder assembly for a vehicle hydraulic braking system comprising a pair of master cylinders which are adapted to be operated simultaneously to effect retardation of a vehicle and independently to assist steering, each master cylinder comprises a pedal-operated primary piston working in a bore, a secondary or floating piston working in a portion of the bore between the primary piston and a closed end of the bore, a primary pressure space defined between the primary and secondary pistons, and a secondary pressure space defined between the secondary piston and the closed end of the bore, the primary pressure spaces are adapted to be connected to brakes on wheels on opposite sides of the vehicle, the secondary pressure spaces are both connected to a common auxiliary braking system, a transfer passage provides communication between the primary pressure spaces when the master cylinders are operated simultaneously, transfer valve means are operative to cut off communication between the primary pressure spaces when one master cylinder is operated on its own, and the secondary pressure spaces are adapted to operate the auxiliary braking system only when the two master cylinders are operated simultaneously, each secondary piston being provided with passage means in communication at all times with a reservoir for fluid, and normally open primary and secondary recuperation valves provide communication betwen the passage means and the primary and secondary pressure spaces when the pistons are in their retracted positions, simultaneous operation of both master cylinders causing both pairs of primary and secondary recuperation valves to close followed by pressurisation of the fluid in both pairs of primary and secondary pressure spaces whereby to apply simultaneously the brakes on opposite sides of the vehicle and to operate the auxiliary braking system, and operation of one of the master cylinders on its own causing the primary and secondary recuperation valves of that master cylinder to close followed by pressurisation of the fluid in the primary pressure space but with fluid in the secondary pressure space being displaced to the reservoir through the open secondary recuperation valve of the other, inoperative, master cylinder whereby to prevent operaton of the auxiliary braking system.

The arrangement of the secondary pistons in our assembly enables us to use a common reservoir for the four pressure spaces and to utilise the secondary recuperation valves to prevent operation of the auxiliary system when one master cylinder is operated on its own. This obviates the need for an additional isolator valve.

An electrically operated pressure-loss warning system may be incorporated in the assembly to indicate the loss of pressure in a secondary pressure space which is only considered necessary since loss of pressure in a primary pressure space would inevitably be apparent from a consequential large increase in pedal travel.

The warning system can be actuated when one of the master cylinders is operated on its own, or when there is a failure in a connection to the auxiliary system.

Preferably, however, we arrange for the warning system to be actuated only as an indication of a failure in the connection to the auxiliary system when both master cylinders are operated simultaneously. This is achieved by incorporating in each master cylinder a switch which is closed upon excessive movement of the secondary piston towards the closed end of the bore due to lack of pressure in the corresponding secondary pressure space, and connecting the two switches together in series whereby the warning system can be actuated only when both switches are closed.

Conveniently movements of the secondary pistons are transmitted to the switches through valve members of the secondary recuperation valves.

Some embodiments of our invention are illustrated in the accompanying drawings in which.

Figure 1:
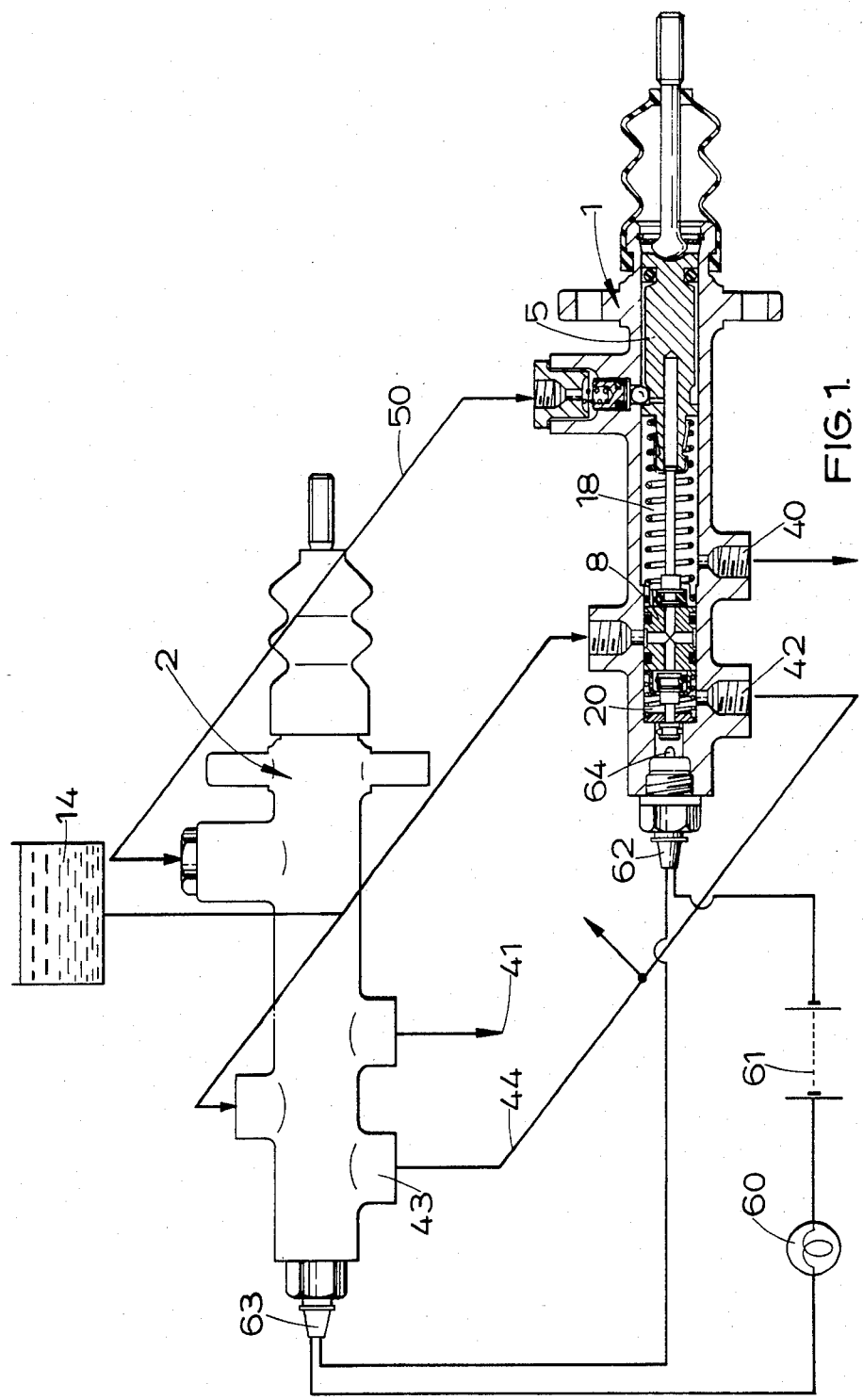
FIG. 1 is a layout of a dual master cylinder assembly for a vehicle braking system.
Figure 2:
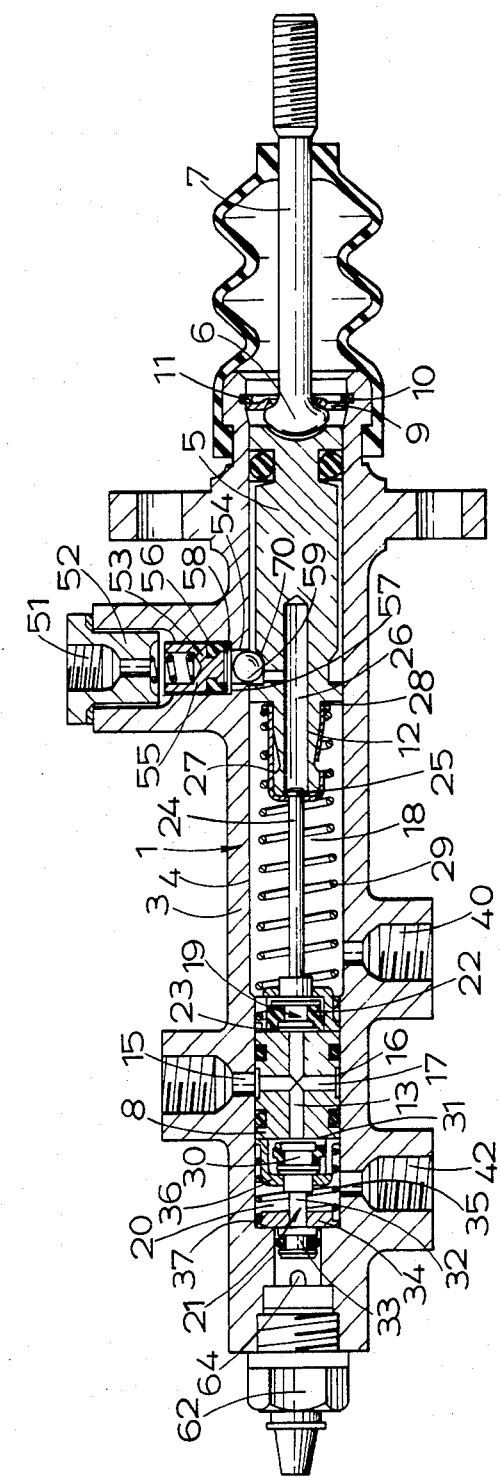
FIG. 2 is a longitudinal section on an enlarged scale of one of the master cylinders.
Figure 3:
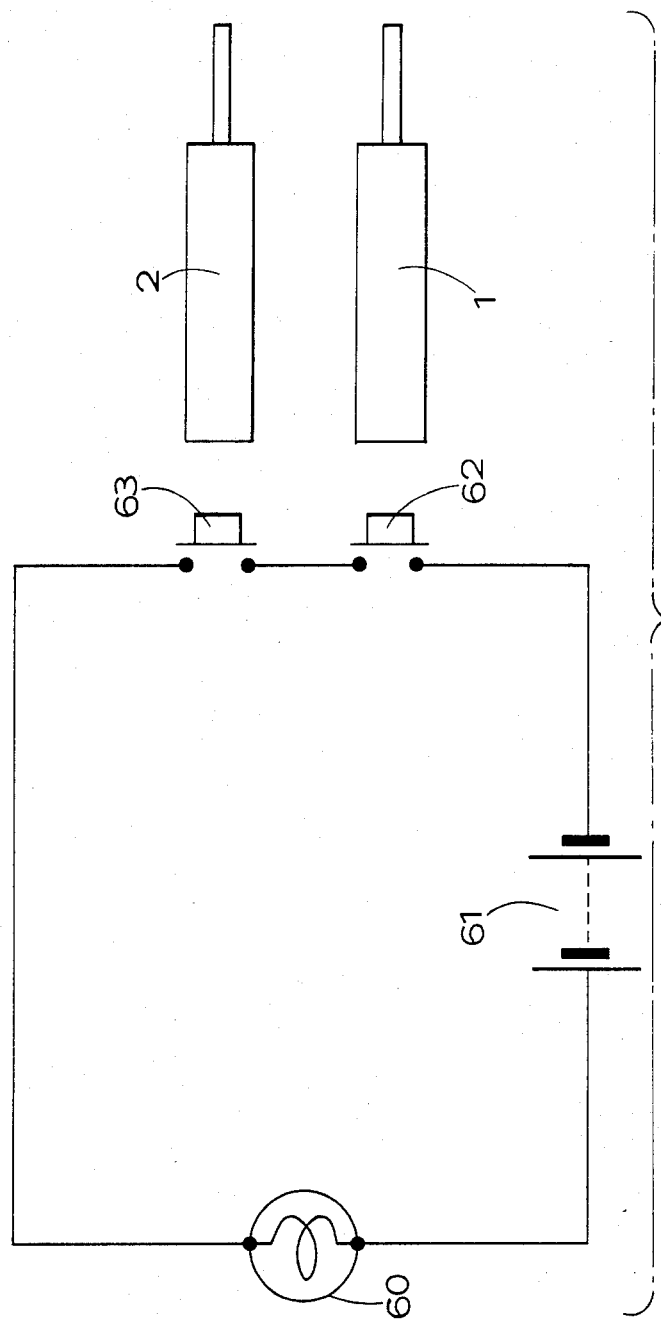
FIG. 3 is a circuit of a pressure-loss warning system which is combined with the assembly.

The dual hydraulic master cylinder assembly illustrated in FIGS. 1 to 3 of the drawings comprises two master cylinders 1 and 2. Since the master cylinders are identical in construction only the master cylinder 1 will be described in detail.

The master cylinder 1 comprises a body 3 provided with a longitudinal bore 4 in which works a primary piston 5 engaged at its rear end by a part-spherical head 6 on a pedal-operated push-rod 7, and a secondary or floating piston 8 disposed between the piston 5 and the closed end of the bore 4. A stop for the head 6 is formed by an annular collar 9 located by a spring ring or circlip 10 received in an annular groove 11 in the bore 4.

The primary piston 5 is provided with a forward extension 12 of reduced diameter.

The secondary piston 8 has a longitudinally extending through bore 13 which is in communication at all times with a reservoir 14 for hydraulic fluid through a recuperation port 15 in the wall of the body 3, an annular passage 16 in the wall of the piston 8, and a diametral passage 17 in the piston 8 which traverses the bore 13.

A primary pressure space 18 defined in the bore 4 between the pistons 5 and 8 communicates with the reservoir 14 through a normally open primary recuperation valve 19, and a secondary pressure space 20 defined in the bore 4 between the secodary piston 8 and the closed end of the bore 4 communicates with the reservoir through a normally open secondary recuperation valve 21.

The recuperation valve 19 comprises a head 22 for engagement with a seating 23 surrounding the bore 13 at the adjacent end of the piston 8. The head 22 is carried by the forward end of an axially extending stem or rod 24 of which the opposite end carries an enlarged head 25 guided to slide in a longitudinally extending bore 26 in the adjacent end of the extension 12. The head 25 is retained within the bore 26 by a thimble 27 which fits over the extension 12. A flange 28 on the thimble 27 forms an abutment for one end of a compression return spring 29 of which the opposite end acts on a cage in which the head 22 is housed. In the position shown in the drawings the spring 29 urges the piston 5 into a retracted position with the head 22 spaced from the seating 23 by the engagement of the thimble 27 with the head 25.

The recuperation valve 21 comprises a head 30 for engagement with a seating 31 surrounding the opposite end of the bore 13 in the piston 8. The head 30 is carried by the rear end of a stem 32 of which the front end carries a piston 33 working in a portion of the bore 4 which is of reduced diameter. The piston 33 is disposed on the opposite side of a plate 34 which engages with the piston 33 and forms an abutment for one end of a compression spring 35 of which the opposite end engages with a cage 36 in which the head 30 is housed. In the position shown the spring 35 acts through the plate 34 to urge it into engagement with a shoulder 37 at the step in diameter and to hold the head 30 in a retracted position spaced from the seating 31.

Outlet ports 40 and 41 leading from the primary pressure spaces 18 of the master cylinder 1 and 2 are connected to the brakes on wheels on opposite sides of the vehicle. Outlets ports 42 and 43 leading from the secondary pressure spaces 20 are interconnected by a pipeline 44 which, in turn, leads to a power valve or hydraulic booster for operating the brake simultaneously, or for operating auxiliary brakes, for example brakes of a trailer adapted to be towed by the vehicle.

The two primary pressure spaces 18 of the master cylinders 1, 2 are interconnected by a transfer passage comprising a pipe-line 50 which is connected at each opposite end to a radial outlet passage 51 in the wall of the body 3 through a suitable union 52, a transfer valve 53, and a transfer port 54.

Each passage 51 extends upwardly from its respective bore 3 when the master cylinders are installed in a vehicle in their positions of use.

The transfer valve 53 comprises a valve member constituted by a piston 55, and a seal 56 of elastomeric material, suitably rubber, mounted on one end of the piston 55, the seal 56 being engageable with a seating 57 comprising a shoulder at a step in diameter in the passage 51 and surrounding the port 54.

The seal 56 is provided with a plurality of integral, discrete, deformable, and collapsible resilient axially extending projections 58 on the circumference of its face adjacent to the seating 57, and, in a normal intermediate position, the valve member is urged toward the seating 57 so that the projections 58 engage with the seating, the remainder of the face of the seal 56 being held out of direct engagement with the seating 57 by the projections 58.

A thrust member 59 in the form of a ball is guided in the transfer port 54. The thrust member 59 is spaced from the seal 56 of the valve member and, in the retracted position shown, engages with a stepped portion of the piston 5.

The assembly incorporates an electrically operated warning system to indicate loss of pressure in the secondary pressure spaces 20. As illustrated the warning system comprises a warning device, suitably a lamp 60, which is connected in series with a battery 61 and two switches 62 and 63, each of which is embodied in the forward end of a respective body 3. Each switch is normally open to break the circuit and has an operating member 64 from which the piston 33 is normally spaced.

When one of the master cylinders, say the master cylinder 1, is operated on its own to facilitate steering a short forward movement of the piston 5 with corresponding compression of the spring 29 is sufficient to cause the head 22 to engage with the seating 23 to isolate the reservoir 14 from the pressure space 18. Simultaneously, or almost immediately thereafter, the piston 5 also urges the thrust member 59 radially outwardly by the engagement therewith of an inclined annular face 70 on the piston 5. This movement urges the valve member 55 away from the adjacent seating 57 and into a fully open positon. Further movement of the piston 5 in the same direction causes fluid to flow through the outlet port 40 to the brake, to the transfer passage 50 through the open transfer valve 53 which, in turn, creates a pressure drop across the valve member of the other master cylinder, urging that valve member towards the adjacent seating in the body of that master cylinder, and advancing the secondary piston 8 towards the closed end of the bore 4.

The resilient projections 58 on the seal 56 collapse so that the face of the seal can engage fully with the seating 57 thereby closing the transfer valve 53 of the said other master cylinder to isolate the pressure spaces 18 of the two master cylinders from each other.

Movement of the secondary piston 8 towards the closed end of the bore 4 causes the seating 31 to engage with the head 30 to isolate the secondary pressure space 8 from the reservoir 14 and fluid displaced from the pressure space 8 by further movement of the piston 8 in the same direction is returned to the reservoir through the pipe-line 44 and the secondary recuperation valve of the master cylinder 2 which is open.

Engagement by the piston 33 of the operating member 64 of the switch 62 fails to operate the warning system since the switch 63 is still open.

When the master cylinders 1, 2 are operated simultaneously to affect braking of the wheels on both sides of the vehicle, the thrust members 59 both act in opposite directions to hold their respective valve members away from the seatings 57, so that the pressure spaces 18 are in free communication to compensate for differential wear of the linings of the brakes which the master cylinders operate, and closure of both secondary recuperation valves 37 isolates both secondary pressure spaces from the reservoir 14 to enable fluid trapped in the pipe-line 44 to be pressurised to operate the auxiliary brakes. The travel of the secondary piston 8 during this operation is insufficent to cause the pistons 33 to operate the switches 62 and 63.

Upon failure of one or both of the secondary pressure spaces 20 or the pipe-line 44, with consequence loss of pressure, both pistons 33 move forwardly to operate both switches 62 and 63. This completes the warnign circuit to energise the lamp 60.

In a modified construction each master cylinder may be "booster assisted".

Figure 4:
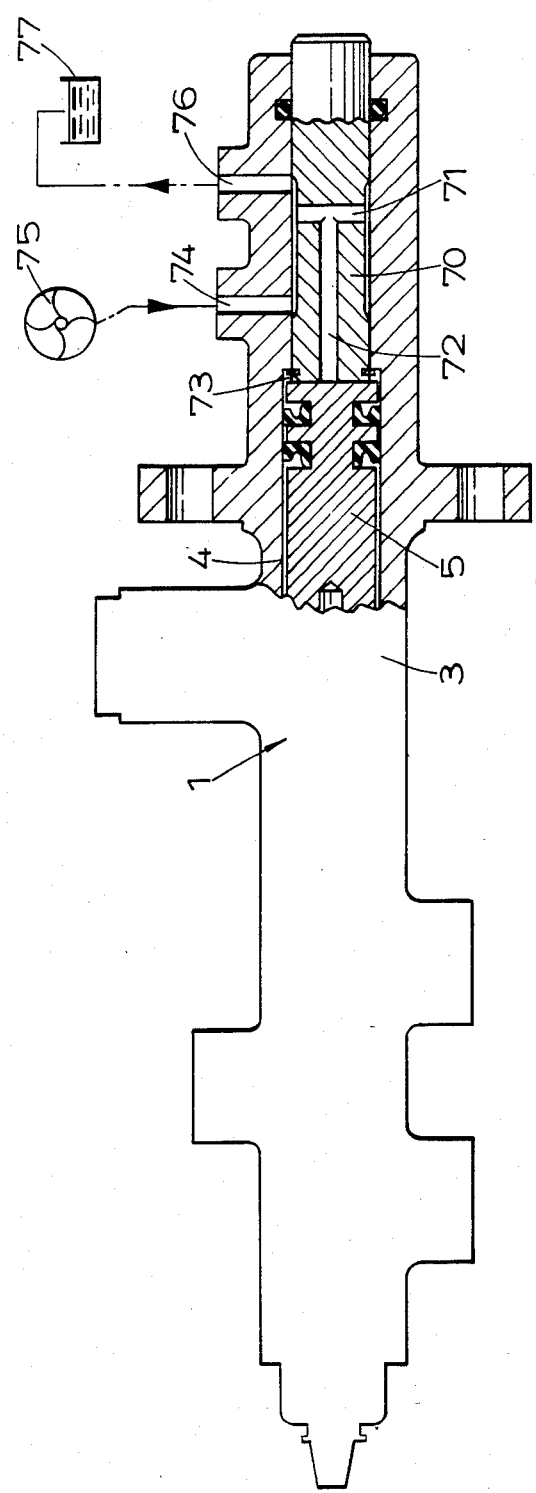
FIG. 4 is a view of one of the master cylinders including a longitudinal section of a modified part of the construction.

As illustrated in FIG. 4 of the drawings, each master cylinder, of which only the master cylinder 1 is illustrated, is modified to incorporate a boost-pressure control valve comprising a spool 70 which works in an extension of the bore 4. At its inner end the spool 70 acts on the piston 5 and at its outer end, which projects from the body 3, is acted upon by the pedal.

The spool 70 is provided with a transverse passage 71 and an axial passage 72 which connects the transverse passage 71 to a boost chamber 73 defined in the bore between adjacent ends of the piston 5 and the spool 70.

The body is provided with a supply port 74 connected to an hydraulic pump 75 and an exhaust port 76 spaced axially from the port 74 and connected to a reservoir 77 for hydraulic fluid.

In the inoperative position shown in the drawing a recess in the external wall of spool 70 interconnects the ports 74 and 76 so that the boost-pressure control valve acts as a valve of the "open-centre" type with the pump 75 drawing fluid from the reservoir 77 and returning it in a closed circuit to the reservoir 77 through the valve at a low pressure. When the master cylinder 1 is operated, either on its own or simultaneously with the other master cylinder 2, the spool 70 is advanced in the bore, initially to restrict, and then subsequently to cut-off, the return to the reservoir 77 through the port 76. This increases the pressure from the pump which is supplied to the boost chamber 73 to act on the piston 5 and advance it in bore 4. At the termination of the brake operation with removal of the force from the pedal the spool 70 is returned to the position shown in the drawing with the ports 7 and 76 reconnected.

The construction and operation of the dual master cylinder assembly is otherwise the same as that described above and corresponding reference numerals have been applied to corresponding parts.

Figure 5:
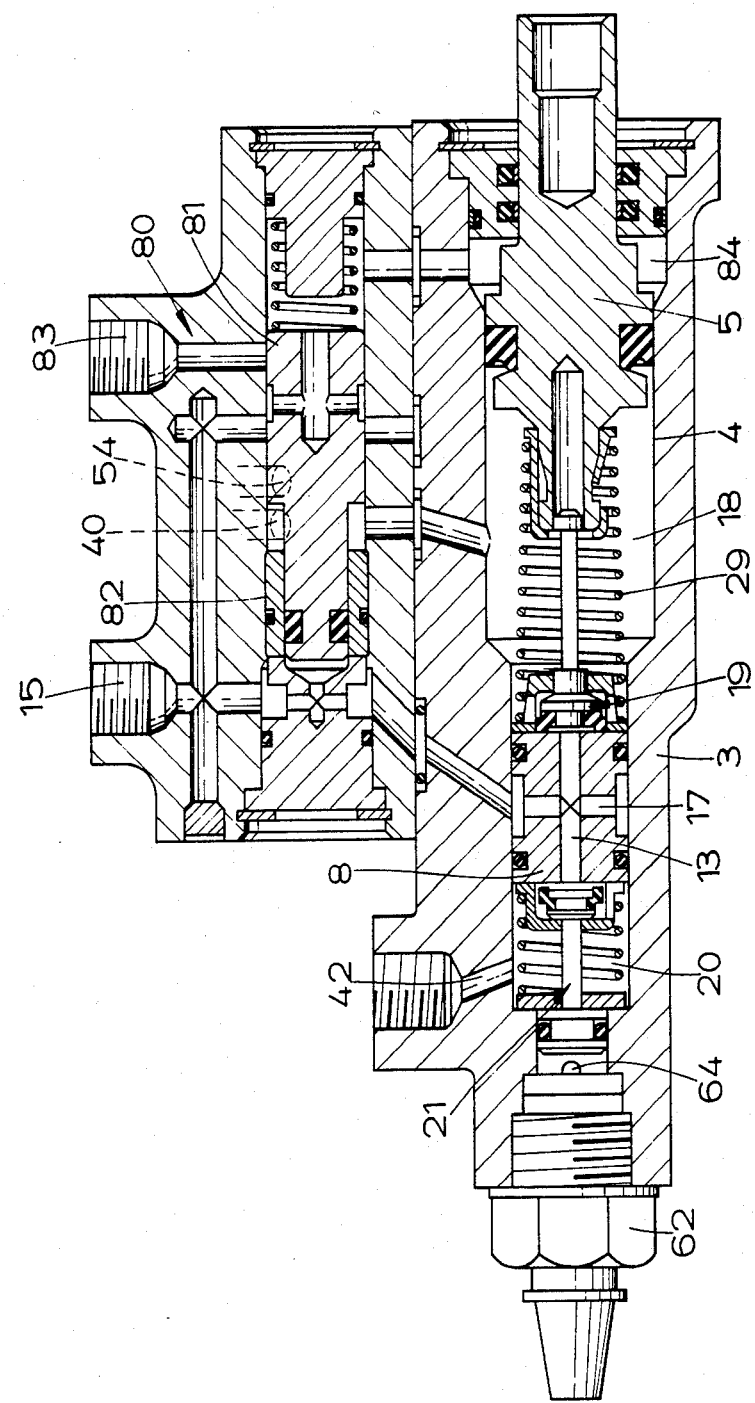
FIG. 5 is a longitudinal section of a further construction of one of the master cylinders.

FIG. 5 is a longitudinal section through the master clinder of the master cylinder assembly. A housing 80 accommodating a boost-pressure control valve of the "closed-centre" type is mounted on the body 3 and the valve comprises a spring-loaded spool 81 working in a longitudinally extending bore 82 in the housing 80.

In the inoperative restricted position illustrated the spool 81 closes the transfer port 54 and a return port 83 connected to a source of hydraulic fluid under pressure, suitably a pump or hydraulic accumulator common to both master cylinders, and passages in the spool 81 place the connection 15 to the reservoir in communication with a boost chamber 84 defined in the bore 4 between the face of the primary piston 5 which is remote from the primary pressure space 18 and a closure 85 for the adjacent end of the bore 4.

When one master cylinder is operated on its own, initially fluid in the primary pressure space 18 is pressurised by operation of the pedal following closure of the primary recuperation valve 19. That fluid is supplied to the brakes operated by that master cylinder through the port 40 and also acts on the spool 81 of the spool valve to place the transfer port 54 in communication with the primary pressure space 18, to isolate the reservoir from the boost chamber 84, and to supply fluid from the source to the boost chamber 84 to augment the brake-applying force applied to the primary piston 5 from the pedal. No transfer of fluid can take place between the primary pressure spaces 18 of the two master cylinders since the transfer port 54 of the other, non-actuated, master cylinder is closed by the spool valve of that master cylinder.

When both master cylinders are operated simultaneously both boost chambers 84 are pressurised from the source to augment the brake-applying forces, and both transfer ports 54 are in communication with their respective primary pressure spaces 18 to permit fluid to be transferred through the transfer connection in order to compensate for differential wear of the friction linings.

The construction and operation of the master cylinder assembly of FIG. 5 is otherwise the same as that of FIGS. 1 to 3 and corresponding reference numerals have been applied to corresponding parts.

I claim:

1. A master cylinder assembly for a vehicle hydraulic braking system comprising a pair of master cylinders, each said master cylinder comprising a housing having a bore, a closure for one end of said bore, a pedal-operated primary piston working in said bore, a secondary floating piston working in a portion of said bore between said primary piston and said closure, a primary pressure space defined in said bore between said primary and secondary pistons, and a secondary pressure space defined in said bore between said secondary piston and said closure, wherein said primary pressure spaces are adapted to be connected to brakes on wheels on opposite sides of the vehicle, said secondary pressure spaces are both connected to a common auxiliary braking system, a transfer passage provides communication between said primary pressure spaces when said master cylinders are operated simultaneously, transfer valve means are operative to cut off communication between said primary pressure spaces when one of said master cylinders is operated on its own, and said secondary pressure spaces are adapted to operate said auxiliary braking system only when said two master cylinders are operated simultaneously, each said secondary piston being provided with passage means in communication at all times with a reservoir for fluid, and normally open primary and secondary recuperation valves provide communication between said passage means and said primary and secondary pressure spaces when said pistons are in retracted positions, simultaneous operation of both said master cylinders causing both pairs of said primary and secondary recuperation valves to close followed by pressurisation of the fluid in both said pairs of primary and secondary pressure spaces whereby to apply simultaneously the brakes on opposite sides of the vehicle and to operate said auxiliary braking system, and operation of one of said master cylinders on its own causing said primary and secondary recuperation valves of the said one master cylinder to close followed by pressurisation of the fluid in said primary pressure space but with fluid in said secondary pressure space being displaced to said reservoir through the open secondary recuperation valve of the other, inoperative, master cylinder whereby to prevent operation of said auxiliary braking system.

2. A master cylinder assembly as claimed in claim 1, including a single reservoir for fluid common to the four pressure spaces.

3. A master cylinder assembly as claimed in claim 1 wherein said passage means in each said secondary piston includes a longitudinally extending through-bore, each said primary recuperation valve comprises a primary valve member, a coupling between said primary vlave member and said respective primary piston, and a primary seating on the adjacent end of said secondary piston with which said valve member is engageable and which surrounds said through-bore, and each said secondary recuperation valve comprises a secondary valve member movable with respect to said end closure, and a second seating opposite the said adjacent end and with which said secondary valve member is engageable and which surrounds said through-bore.

4. A master cylinder assembly as claimed in claim 3, wherein each said primary valve member is normally urged away from its respective seating by means of a return spring for said primary piston to which said valve member is coupled, and each said secondary valve member is normally urged towards it respective said seating by means of a return spring which acts between said secondary valve member and said end closure, said secondary piston being freely movable in said bore.

5. A master cylinder assembly as claimed in claim 1, wherein an electrically operated pressure-loss warning system is incorporated to indicate the loss of pressure in one of said secondary pressure spaces and wherein each said master cylinder incorporates a switch which is closed upon excessive movement of the secondary piston towards said end closure due to lake of pressure in said corresponding secondary pressure space, and said two switches are connected together in series whereby said warning system can be actuated only when both said switches are closed.

6. A master cylinder assembly as claimed in claim 5, wherein said valve members of said secondary recuperation valves are adapted to transmit movements of said secondary pistons to said switches.

* * * * *